United States Patent [19]

McDonald

[11] Patent Number: 5,190,679
[45] Date of Patent: Mar. 2, 1993

[54] AQUEOUS BASED LOOSENER COMPOSITION ADAPTED FOR REMOVING CABLE FROM A CONDUIT

[75] Inventor: William P. McDonald, Viroqua, Wis.

[73] Assignee: American Polywater Corporation, Stillwater, Minn.

[21] Appl. No.: 669,483

[22] Filed: Mar. 14, 1991

[51] Int. Cl.$^5$ ............................................. C10M 3/04
[52] U.S. Cl. ................................ 252/41; 252/49.3; 252/49.5; 252/51.5 R; 252/51.5 A; 252/52 A; 252/56 R; 252/56 S; 72/42
[58] Field of Search ............ 252/41, 49.3, 49.5, 252/51.5 R, 51.5 A, 52 A, 56 R, 56 S; 72/42

[56] References Cited

U.S. PATENT DOCUMENTS

| | | | |
|---|---|---|---|
| 2,631,978 | 3/1953 | Bersworth | 252/49.3 |
| 3,374,171 | 3/1968 | Doris | 252/49.3 |
| 4,111,820 | 9/1978 | Conti | 252/49.3 |
| 4,378,299 | 3/1983 | Alexander | 252/49.3 |
| 4,461,712 | 7/1984 | Jonnes | 252/49.3 |
| 4,522,733 | 6/1985 | Jonnes | 252/49.3 |
| 4,668,410 | 5/1987 | Haas et al. | 252/49.3 |
| 4,781,847 | 11/1988 | Weitz | 252/49.3 |

OTHER PUBLICATIONS

Hackh's Chemical Dictionary, 4th Ed; Grant McGraw-Hill Book Co., 1969, pp. 624–625 and 331, N.Y.

Noller, Chemistry or Organic Compounds, 2nd Ed., W. B. Saunders Company, Philadelphia, 1957 pp. 81–82.

"Acintol TM FA-1 Tall Oil Fatty Acid" (Arizona Chemical Company) Product Data Sheet No. 6101.

"Polytec Anionic Polymers" (Tecna Corporation) Product Data Sheet.

Material Safety Data sheets for the following chemicals: 1. Polytec 31 Anionic Polyacrylamide (Tecna Corporation); 2. Versene 220 Crystals Chelating Agent (Dow Chemical); 3. Acintol FA-1 (Arizona Chemical Company); 4. d-Limonene (Florida Chemical Co., Inc.); 5. Solvent Naphtha (Shell); 6. Propylene Glycol (Cangard Industries Limited); 7. Propylene Glycol (American Polywater Corp.); 8. Active #20 (Blew Chemical Company); 9. Acritamer 940 (R.I.T.A. Corporation);10. Caustic Potash (American Polywater Corp.)

Polywater ® F Lubricant (American Polywater Corporation) Technican Bulletin#37.

"Carbopol Resins Offer Three Main Functions".

"Glycols" (Thompson Hayward Chemical Co.)

Primary Examiner—Margaret Medley
Attorney, Agent, or Firm—Merchant, Gould, Smith, Edell, Welter & Schmidt

[57] ABSTRACT

An aqueous based loosener composition is provided which is particularly useful in removing cable from a conduit. The composition comprises an effective amount of a lubricating agent such as a fatty acid salt compound, an effective amount of a solvating agent such as a nonpolar hydrocarbon compound, and a major proportion of water. A method for removing cable from a conduit using the aqueous based composition is also provided.

14 Claims, No Drawings

AQUEOUS BASED LOOSENER COMPOSITION ADAPTED FOR REMOVING CABLE FROM A CONDUIT

FIELD OF THE INVENTION

The invention relates to aqueous based compositions having both a lubricating and solvating function. More specifically, the invention relates to aqueous based loosening compositions particularly useful in the removal of electrical cable, telephone cable or such from a conduit.

BACKGROUND OF THE INVENTION

The removal of various types of cables from conduits is a common practice, especially when the cables have been employed in the conduit for many years. The removal of the cables is often necessary to upgrade and improve systems which use electrical cables in them. Recabling is common in the refurbishment of electrical and communication systems. In such refurbishment, for both practical and economic reasons, the new cables are often installed in existing conduits. To get the new cable in, the old cable must be pulled out.

In theory, the removal of old cable from a conduit should be straight forward. If the cable could be pulled in to begin with it should be possible to pull it back out. However, a high coefficient of friction of the cable in the conduit can exist since the old soap or wax lubricants used to install the cable will be long gone or hardened. If the tension required to remove the cable from the conduit is more than the tensile strength of the conductors, the cable wires will break and removal of the cable from the conduit will not be completed without drastic measures such as breaking into the conduit, often requiring removal of a wall, digging up the ground, etc.

In lubricating the interface between two relatively moving cable and conduit surfaces a number of requirements must be met. The lubricant must be essentially chemically and physically inert with respect to the surfaces. The lubricant must reduce the force required to move one surface over the other and the lubricant must be in a form that permits the easy application of the lubricant to one or both surfaces. Examples of lubricants particularly useful in installing cable into a conduit are disclosed in U.S. Pat. Nos. 4,461,712, 4,522,733 and 4,781,847 which are aqueous based lubricants.

Lubricants lower the coefficient of friction of the cable jacket against the conduit wall, which lowers the tension required to remove or pull out the cable. However, pulling tension is not the only problem in removing old cable from a conduit. Often the cable is adhered or cemented (commonly termed "frozen") to the conduit by dried wax or soap lubricants, silt, rust, or exuded bitumen. While this bonding is discontinuous and weak, it can still require enormous force to initially move the cable because it is necessary to shear the whole length of the adhesive bond. This adhesion can require a force great enough that the cable wires break rather than pull away from the conduit. Prior cable lubricants do not dissolve the cable bonding agents which are present in many conduits having old cable.

Therefore, a need exists for a loosening composition that can be easily handled, easily applied, and easily cleaned, which provides effective lubricating and solvating properties for binding agents in a conduit having a cable, allowing for easy removal of the cable from the conduit.

SUMMARY OF THE INVENTION

The invention is an aqueous based loosener composition for removing cable from a conduit comprising an effective amount of a lubricating agent which comprises a fatty acid salt compound, a polyacrylamide compound, a polyalkylene oxide compound, a polyalkylene glycol compound, or mixtures thereof; an effective amount of a solvating agent which comprises a nonpolar hydrocarbon compound, a ketone compound, an ester compound, an ether or glycol ether compound, a nitrogenated compound, a sulfurated compound, or mixtures thereof; and a major proportion of water. The nonpolar hydrocarbon compound can be selected from such compounds as a liquid terpene, a petrochemical hydrocarbon, a liquid halogenated hydrocarbon, or mixtures thereof. The aqueous composition of the invention can have a pH of about 3 to 12. The composition can further comprise other components such as a nonionic surfactant, a sequestrant, a polyelectrolyte acrylate, an alkaline source, an alcohol, etc., or mixtures thereof.

The composition of the invention has both lubricating and solvating properties and is particularly useful for softening or dissolving binding agents binding old cable to a conduit. This action aids in the removal of old cable which is stuck or "frozen" in the conduit. The composition also acts as a lubricant to minimize the force required to pull the cable out of the conduit once it has broken free. This allows for the reuse of old conduits thereby minimizing duplicate construction or expensive conduit replacement in system upgrades.

A method for removing cable from a conduit is also provided comprising the steps of dispersing the aqueous based composition within the conduit, and pulling the cable from the conduit after an effective period of time in which the composition has loosened the cable within the conduit. The aqueous based composition of the invention will loosen and help remove cables held in conduits by binders such as wax, bitumen, rust, dirt, soap or other hardened adhesive residues.

One aspect of the invention is the aqueous based composition useful in removing cable from a conduit. Another aspect of the invention relates to a method of removing cable from a conduit using the aqueous based composition of the invention.

DETAILED DESCRIPTION OF THE INVENTION

The invention resides in an aqueous based composition comprising an effective amount of a lubricating agent, an effective amount of a solvating agent, and a major proportion of water. The aqueous composition of the invention is a general purpose dissolver/lubricant which is particularly useful for removing old cable from a conduit. The composition is a thick, pourable liquid for convenient loading into a conduit and can dissolve binding agents such as waxes, bitumens, soil deposits, soap residues, and rust in old metal conduits. The composition also provides a lubricating film to ease cable removal from the conduit once the cable has broken free.

I. Lubricating Agents

There are a wide variety of lubricating agents which can be employed in the aqueous based composition of the invention. The only requirement in selecting such lubricants is that they be compatible with the other components of the composition and provide the intended lubricating function. Suitable lubricating agents include various fatty acid salt compounds, polyacrylamide compounds, polyalkylene oxide compounds, and polyalkylene glycol compounds, which may be employed singly or in a variety of mixtures.

A. Fatty Acid Compounds

A wide variety of carboxylic fatty acids may be usefully employed in the aqueous based composition of the invention. Basic salts formed from an alkali metal, alkaline earth metal, an organic amine or ammonia and an aliphatic fatty acid can be used in the composition of the invention. Those acids found to provide effective lubricity are those having the general formula RCOOH wherein R represents an aliphatic group from about 5 to about 24 carbon atoms (fatty acids having about 6 to 25 carbon atoms). The aliphatic group may be branched or unbranched and saturated or unsaturated but is preferably a straight chain alkyl group. Preferred carboxylic acids include $C_2$ to $C_{25}$ fatty acids or mixtures thereof.

Specific examples of suitable carboxylic acids include such saturated fatty acids as enanthic (heptanoic) ($C_7$), caprylic (octanoic) ($C_8$), pelargonic (nonanoic) ($C_9$), capric, (decanoic) ($C_{10}$), undecyclic (undecanoic) ($C_{11}$), lauric (dodecanoic) ($C_{12}$), tridecilic (tridecanoic) ($C_{13}$), myristic (tetradecanoic) ($C_{14}$) palmitic (hexadecanoic) ($C_{16}$), stearic (octodecanoic) ($C_{18}$), arachidic (eicosanoic) ($C_{20}$), behenic (docosanoic) ($C_{22}$), and lignoceric (tetracosanoic) ($C_{24}$); monounsaturated fatty acids such as lauroleic ($C_{12}$), myristoleic ($C_{14}$), palmitoleic ($C_{16}$), oleic ($C_{18}$), gadoleic ($C_{20}$), and brassidic ($C_{22}$); polyunsaturated fatty acids such as linoleic (di-unsaturated $C_{18}$), and linolenic (tri-unsaturated $C_{18}$), arachidonic ($C_{20}$); and substituted fatty acids such as ricinoleic (hydroxysubstituted $C_{18}$), etc. These acids can be derived from both natural and synthetic sources. Natural sources include animal and vegetable fats or oils which can be partially or fully hydrogenated if desired. Synthetic acids can be produced by the oxidation of petroleum wax, for example synthetic acids commercially available from Sun Oil Company. Particularly, preferred fatty acid compounds for use in the composition of the invention are the $C_{16}$ to $C_{20}$ carboxylic fatty acids.

Mixed fatty acids may be employed in the composition of the invention such as those derived from fats and oils. One example of a useful fatty acid mixture is coconut oil fatty acid which includes major fractions of lauric and myristic acids and minor fractions of palmitic, stearic, oleic and linoleic acids. Tall oil fatty acids are particularly preferred for use in the composition of the invention. Tall oil fatty acid is obtained as a by-product of the paper industry from the tall oil recovered from pine wood black liquor. Tall oil fatty acids include major fractions of oleic and linoleic acids and minor fractions of palmitic, stearic and isostearic acids. One available source of tall oil fatty acid is known as ACINTOL ®FA-1 from Arizona Chemical Company.

B. Polyacrylamide Compounds

Polyacrylamide compounds may also be employed in the composition of the invention singly or in combination with other lubricants. These compounds are well known polymeric and copolymeric compounds formed by polymerizing an acrylamide type monomer of the formula:

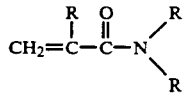

wherein R is independently a $C_{1-10}$ alkyl, such as acrylamide, propionic acid amide, methacrylamide (2-methylpropionic acid amide), etc. Copolymers can be made by copolymerizing the acrylamide monomer with other acrylic monomers such as acrylic acid, methacrylic acid, methyl acrylate, methyl methacrylate, etc. Preferred polyacrylamide polymers are homopolymers of acrylamide, which compound has the following formula:

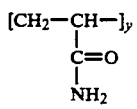

wherein y is $1 \times 10^3$ to $3 \times 10^5$. Copolymers of acrylamide and an acrylic or methacrylic monomer having a molecular weight of about $1 \times 10^5$ to $20 \times 10^6$ are most preferred. The preferred polymers contain sufficient acrylic monomer to produce a low, medium or high anionic functionality from the pendant carboxyl groups. Polyacrylamide polymers can reduce friction at concentrations as little as 0.003%. An aqueous solution of polyacrylamide can produce significant reductions in frictional force needed to move surfaces past one another. These compounds aid in the lubricating function of the composition when they are employed and can be combined with many other types of compounds.

C. Polyalkylene Oxide and Glycol Compounds

Polyalkylene oxide and polyalkylene glycol compounds can be used in the composition of the invention and are well known polymeric and copolymeric compounds formed by polymerizing alkylene oxide or glycol compounds including ethylene oxide, propylene oxide, butylene oxide, ethylene glycol, propylene glycol, etc. The polyalkylene oxide and glycol compounds useful in the invention can have a molecular weight from 120 to $5 \times 10^6$. Preferred polyalkylene oxide compounds comprise polyethylene oxide and polypropylene oxide having a molecular weight of about $3 \times 10^5$ to $5 \times 10^6$. Preferred polyalkylene glycols comprise polyethylene glycol and polypropylene glycol having a molecular weight of about 120 to 5000. A particularly preferred compound comprises a polyethylene oxide compound having a molecular weight from about $3 \times 10^5$ to $5 \times 10^6$ which compound has the following formula:

wherein y is $1 \times 10^4$ to $3 \times 10^5$. Most preferred are polyethylene oxide compounds having a molecular weight of about $3 \times 10^6$ to $5 \times 10^6$. Polyethylene oxide polymers can reduce friction at concentrations as little as 0.003% and an aqueous solution can produce significant reductions in the frictional force needed to move surfaces past one another. Polyethylene oxides provide lubricity and a "silky" feel to aqueous solutions, are tolerant of electrolytes, can be combined with many other types of compounds, and have low toxicity.

The aqueous based composition of the invention can comprise about 0.1 to 25 wt %, preferably about 0.5 to 10 wt %, and most preferably about 1 to 4 wt % of the lubricating agent.

II. Solvating Agents

A solvating agent is employed in the aqueous based composition of the invention to provide for softening or dissolving of binding agents such as soaps, waxes, bitumens, soil deposits, and rust which are often found in conduits containing old cable. A variety of nonpolar hydrocarbon solvent compounds can be employed in the solvating agent of the composition of the invention. Various oxygenated solvent compounds may also be employed such as ketone compounds, ester compounds, ether or glycol ether compounds, etc., as well as various nitrogenated and sulfurated solvent compounds. These compounds may be employed singly or in a variety of mixtures in the composition of the invention.

A. Hydrocarbon Solvents

A variety of nonpolar hydrocarbon solvents can be employed in the solvating agent, including various liquid terpenes, petrochemical hydrocarbons, liquid halogenated hydrocarbons, etc.

Terpenes

The terpenes are a class of organic compounds, a common structural feature of which is a carbon skeleton of repeating isopentane units:

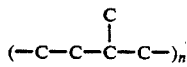

Terpenes are widely distributed in nature and the lower members of the series, the monoterpenes (n=2) and the sesquiterpenes (n=3) are the major components of the volatile or "essential" oils of most plants. The diterpenes, triterpenes and carotenes which have 4, 6 and 8 isopentane units are found among the nonvolatile plant extractives, and polyterpenes (natural rubber and guttapercha) are present as lattices in some species.

The name "terpene" as used herein is restricted to hydrocarbons of empirical formula $(C_5H_8)_n$. The related derivatives of terpenes are called terpenoids and together they represent a group of extraordinary variety, including nearly every common functional group and a variety of carbon skeletons. There are, for example, several acyclic, monocyclic and bicyclic structures among the monoterpenes and sesquiterpenes.

Specific examples of suitable terpenes for use in the invention include acyclic monoterpene hydrocarbons such as myrcene, ocimene, and alloocimene; monocyclic monoterpene hydrocarbons such as p-menthane (cis and trans), limonene (d or l), 3,8-p-menthadiene, α-phellandrene, β-phellandrene, α-terpinene, γ-terpinene, terpinolene, isoterpinolene, carvomenthene, 3-p-menthene, and p-cymene; bicyclic monoterpene hydrocarbons such as pinane, α-pinene, β-pinene, carane, 3-carene, 4-carene, camphene, α-fenchene, and tricyclene. Sesquiterpenes can also be employed in the invention such as nerolidol, farnesol, α-caryophyllene, β-caryophyllene, longifolene, α-cedrene, β-cedrene, cedrol, guaiol, α-santalol and β-santalol. The above terpenes can be employed singly or in a variety of mixtures in the composition of the present invention.

The monoterpenes are derived essentially from oils. Materials furnishing large volumes of monoterpenes are turpentine, pine oil, citrus limonene, Japanese mint oil, camphor oil, citronella oil, and lemongrass oil. Turpentine is by far the largest source of monoterpenes. The major components of commercial terpentine are α-pinene, β-pinene, camphene, and 3-carene. Large amounts of monocyclic monoterpene hydrocarbons arise from extraction of southeastern pine stumps and as by-products in the conversion of α-pinene to synthetic pine oil or camphene. Relatively small amounts of monocyclic monoterpene hydrocarbons are obtained by the rectification of crude sulfate turpentine. The monocyclic monoterpenes are produced as technical mixtures by fractional distillation from any of the sources mentioned above.

A particularly preferred terpene solvent for use in the composition of the invention is d-limonene which is obtained as a by-product from the citrus juice industry. After extraction of the juice from the fruit in a mechanical extractor, the orange (or other citrus) skins are treated with lime and pressed. The press liquor is evaporated to produce citrus molasses and the limonene is recovered from the condensate from the evaporators. The source of the limonene is the oil cells in the skin of the orange or other citrus fruit. Citrus limonene typically analyzes 90-95% pure by gas chromatography. Impurities are fatty aldehydes, myrcene, and terpene alcohols, chiefly acyclic.

Petrochemical Hydrocarbons

A wide variety of petrochemical hydrocarbon compounds are available and useful in the composition of the invention and are derived from petroleum and natural gas feed stocks. The term petroleum is applied to the deposits of oily materials, usually composed largely of hydrocarbons, found in the upper strata of the earth's crust. Petroleum derived hydrocarbon solvents which can employed in the composition of the invention include petroleum distillates such as paraffins, isoparaffins, cycloparaffins (naphthenes), and aromatic hydrocarbons including benzene, toluene, naphthalene, xylene and related compounds. Synthetic liquid paraffins built from methane units derived from natural gas may also be employed in the composition of the invention. Suitable synthetic paraffins include pure forms of nonane, decane, dodecane pentadecane, cetane, etc.

The solvent power of aromatic hydrocarbons is usually greater than that of aliphatic hydrocarbons. There are numerous grades of petroleum hydrocarbons available based upon their proportions of aromatic and aliphatic materials. Naphtha is a distillate of petroleum with a boiling range lower than about 400° or 500° F. As a process intermediate, naphtha includes the components used to formulate gasoline and the lighter grades of fuel oil such as kerosene and diesel fuel oil. A preferred hydrocarbon solvent available from Shell (Sol 140) is a solvent naphtha of predominantly $C_{9-12}$ hydrocarbons and includes major proportions of paraffins and naphthenes, and minor amounts of aromatics and olefins.

Halogenated Hydrocarbons

Halogenated hydrocarbons such as chlorinated or fluorinated hydrocarbons may also be employed as a solvent component in the composition of the invention.

Suitable chlorinated hydrocarbons include carbon tetrachloride, chloroform, ethyl chloride, trichloroethane, ethylene dichloride, methylene chloride, perchloroethylene, trichloroethylene, tetrachloroethane, monochlorobenzene, etc., or mixtures thereof. Fluorinated hydrocarbons which are suitable include dichlorofluoromethane, dichlorotrifluoroethane, pentafluorodichloropropane, pentafluoropropanol, trichlorotrifluoroethane, etc., or mixtures thereof.

B. Other Solvents

Other types of solvents may also be employed in the solvating agent of the composition of the invention. These include a wide variety of solvents such as oxygenated compounds, nitrogenated compounds, sulferated compounds, etc. Suitable oxygenated compounds that can be used include ethers and glycol ethers such as dimethyl ether, monoethyl ether, ethylene glycol monoethyl ether, ethylene glycol monobutyl ether, propylene glycol methyl ether, dipropylene glycol methyl ether, propoxy diethylene glycol, etc.; ketones such as acetone, methyl ethyl ketone, methyl isobutyl ketone, ethyl amyl ketone, cyclohexanone, etc.; esters such as amyl acetate, methyl acetate, ethyl acetate, n-propyl acetate, isopropyl acetate, n-butyl acetate, isobutyl acetate, butyl lactate, etc. Suitable nitrogenated compounds include nitroparaffins such as nitromethane, nitroethane, 1-nitropropane, 2-nitropropane, nitrobenzene, etc. Suitable sulfurated compounds include dimethylsulfoxide, carbon disulfide, etc.

The aqueous based composition of the invention can comprise about 2 to 50 wt %, preferably about 5 to 30 wt %, and most preferably about 10 to 20 wt % of the solvating agent.

III. Water

The aqueous based composition of the invention is formulated as a liquid composition and includes a major proportion of water in addition to the lubricating and solvating agents. The water employed in the composition of the invention acts not only as a carrier, but aids in the solvating function of the composition. The water is preferably deionized before it is employed in formulating the composition and can comprise about 25 to 95% of the composition, preferably about 65 to 85 wt % of the composition.

IV. Other Components

The aqueous based loosening composition of the invention can optionally comprise a variety of additional components to enhance the performance of the composition. These components can be employed singly or in a variety of mixtures in formulating the composition of the invention.

A. Nonionic Surfactants

The composition of the invention may optionally further include a nonionic surfactant, which acts as an emulsifying agent for the composition. Nonionic surfactants are generally hydrophobic compounds which bear essentially no charge and exhibit a degree of hydrophilic tendency due to the presence of ether oxygen in the molecule. Nonionic surfactants encompass a wide variety of polymeric compounds which include specifically, but not exclusively, ethoxylated alkyl phenols, ethoxylated aliphatic alcohols, carboxylic esters, carboxylic amides and polyoxyalkylene oxide block copolymers.

Particularly suitable nonionic surfactants for use in the composition of the invention are those having the general formula $RB_nOR_1$ wherein R is an alkyl, aryl or alkaryl group having from about 8 to about 24 carbon atoms; B represents an oxy $(C_{2-4})$ alkylene group (—O—alkylene-); $R_1$ is hydrogen, a $C_{1-4}$ alkyl group, or an aryl group; and n is a number from 1 to 20 which represents the average number of oxyalkylene groups on the molecule.

Suitable nonionic surfactants which can be employed include specifically, but not exclusively, polyalkylene oxide alkoxylates such as alkyl propoxylate; ethoxylated alcohols such as octyl alcohol ethoxylate, decyl alcohol ethoxylate, dodecyl alcohol ethoxylate, tetradecyl alcohol ethoxylate and hexadecyl alcohol ethoxylate; alkoxylates of oxo alcohols having from about 9 to 17 carbon atoms; and ethoxylated alkyl phenols such as nonyl phenol ethoxylate (NPE). The above nonionic surfactants can be employed singly or in a variety of mixtures in the composition of the invention. The nonionic surfactant can comprise about 0.2 to 5 wt %, preferably about 2 to 4 wt % based on the composition.

B. Sequestrants

The composition of the invention may also optionally contain a sequestrant or chelating agent for the purpose of complexing or chelating hardness components such as are found in metal conduits and aiding in removing rust found in such conduits. Such sequestrants or chelating agents combine with metal ions to produce soluble complexes or chelate compounds. The most common and widely used sequestrants are those that coordinate metal ions through oxygen and/or nitrogen donor atoms. The sequestrant used in the composition of the invention may be organic or inorganic so long as it is compatible with the other components of the composition. Based upon availability and overall compatibility with other components, the preferred sequestrant is sodium ethylenediamine tetraacetic acid (EDTA). The sequestrant can comprise about 0.1 to 5 wt % of the composition, preferably about 0.2 to 0.7 wt % based on the composition.

C. Hydroxy Compounds

Hydroxy compounds or alcohols (i.e., hydroxy substituted aliphatic compounds) can also be employed in the composition of the invention. These compounds assist in the solvating function of the composition and are preferably employed to provide antifreeze, preservative and antioxidant properties. Large amounts of hydroxy compounds such as various glycols can be employed in the composition of the invention when antifreeze properties are desired.

Suitable compounds include hydroxy substituted aliphatic compounds having from 1 to 3 hydroxy groups and from 1 to 6 carbon atoms. The hydroxy compounds can be essentially straight or branched chained compounds. Examples of suitable hydroxy compounds include alcohols and glycols such as methanol, ethanol, propanol, isopropanol, n-butanol, isobutanol, tertiary butanol, amyl alcohol, isoamyl alcohol, n-hexanol, t-hexanol, cyclohexanol, ethylene glycol, propylene glycol, glycerine, etc.; Preferred hydroxy compounds include methanol, ethanol, isopropanol, ethylene glycol, and propylene glycol. When employed in the composition of the invention, the hydroxy compounds can comprise about 1 to 50 wt %, preferably about 2 to 20 wt % based on the composition.

D. Acrylate Compounds

Acrylate polyelectrolyte compounds may also be employed in the composition of the invention which act as thickeners and flow agents for viscosity control. These polymers are derived from the polymerization of at least one polymerizable acrylate monomer having an ethylenically unsaturated group and a hydrophilic acidic group, that can maintain an ionized electrical charge in solution, selected from the class consisting of carboxylic acid, carboxylic acid anhydride, carboxylic acid halide, or mixtures thereof. Preferred organic polymeric acrylate type polymers are made from carboxylic acid containing monomers, forming polyelectrolyte organic polymers which are anionic in nature. Useful monomers include acrylic acid, acrylic acid esters and salts, methacrylic acid, methacrylic acid esters and salts, alpha-beta unsaturated dicarboxylic anhydride compounds such as maleic anhydride, itaconic acid, citriconic acid and others. Along with the acidic carboxyl containing monomers, other monomers can be used in preparing the polymers which do not detract from the polyelectrolyte or carboxylic acid nature of the polymer. Such comonomers can include styrene, vinyl acetate, vinyl chloride, vinyl ethers, ethylene, isobutylene and others.

Preferably, the acrylate polyelectrolyte employed in the composition of the invention is a polyacrylic acid having a molecular weight of at least about 450,000, preferably about $3 \times 10^6$ to $4 \times 10^6$. When employed in the composition of the invention, the acrylate compounds can comprise about 0.01 to 2 wt %, preferably about 0.1 to 0.3 wt % based on the composition.

E. Alkaline Source

The composition of the invention may also include a source of alkalinity sufficient to increase the pH above neutral so a basic solution is produced and to neutralize the carboxylic fatty acid or the polyacrylic acid when employed in the composition. The source of alkalinity may be conveniently selected from any compatible alkaline compound. A non-exhaustive list of suitable sources of alkalinity includes ammonia and ammonium hydroxide; alkali metal hydroxides such as sodium hydroxide and potassium hydroxide; amino compounds such as monoethanolamine, diethanolamine, and triethanolamine; and alkali metal silicates such as sodium metasilicate and sodium orthosilicate. The preferred source of alkalinity for use in the composition of the invention is an alkali metal hydroxide such as sodium hydroxide or potassium hydroxide. When employed in the composition of the invention, the alkaline source can comprise about 0.1 to 10 wt %, preferably about 0.5 to 2 wt % based on the composition.

In addition to the above mentioned components, the aqueous based loosener composition of the invention may also contain those components conventionally employed which are compatible with the composition to achieve specified characteristics such as perfumes, dyes, corrosion inhibitors, etc. When used these additives are chemically present in amounts within the range of about 0.01 to 5 wt % of the composition, preferably about 0.05 to 2 wt % of the composition.

A particularly preferred aqueous based composition of the invention comprises about 0.5 to 10 wt % of a lubricating agent comprising a fatty acid salt compound, a polyacrylamide compound, a polyalkylene oxide compound, a polyalkylene glycol compound, or mixtures thereof; about 5 to 30 wt % of a solvating agent comprising a nonpolar hydrocarbon compound, a ketone compound, an ester compound, an ether or glycol ether compound, a nitrogenated compound, a sulfurated compound, or mixtures thereof; about 0.2 to 5 wt % of a nonionic surfactant; about 0.1 to 5 wt % of a sequestrant, and a major proportion of water. This composition may further comprise about 0.1 to 10 wt % of an alkaline source, about 2 to 20 wt % of a oxygenated compound, and about 0.01 to 2 wt % of a polyelectrolyte acrylate compound. The composition of the invention can have a pH of about 3 to 12, preferably about 7 to 9.

The aqueous based composition of the invention may be formulated by mixing the above components in any of a number of different ways with a major proportion of water. When a fatty acid is employed as a lubricant, it can be added to the composition in its salt form initially or it can be added in its acidic form which will react with the alkaline source when present to produce the fatty acid salt. The other components may be added at any convenient stage during the formulation process. The composition of the invention may be formulated into a liquid concentrate composition or a ready-to-use liquid composition.

V. Methods of Use

The aqueous based composition of the invention is a general purpose dissolver/lubricant which is particularly useful for removing old "frozen" cable, such as electrical, telephone, or television cable from a conduit. The composition is a thick, pourable liquid for convenient loading into a conduit and has both lubricating and solvating properties. The composition is particularly useful for softening or dissolving adhesive residues binding old cable to a conduit, such as waxes, soap, bitumens, and soil deposits, and is useful in removing rust from old metal conduits. The composition can thus be employed in removing old cable from a conduit by dissolving the binding agents in the conduit and lubricating the conduit to minimize the force required to pull the cable out of the conduit once it has broken free. The composition allows for the reuse of old conduits, minimizing duplicate construction or expensive conduit replacement in system upgrades. Therefore, the potential dollar savings from a successful removal of "frozen" cables without damaging the conduit is very high.

In a method for removing cable from a conduit the aqueous based composition of the invention comprising a lubricating agent, a solvating agent, and a major proportion of water, is dispersed within the conduit. The cable is then pulled from the conduit after an effective period of time in which the composition has loosened the cable within the conduit. A variety of techniques can be used to get the composition dispersed through the conduit system. One suitable method is to pump the composition into the conduit and then blow compressed air through the conduit. Gravity flow can also be used on vertical conduit systems. The aqueous based composition may be dispersed within the conduit at varying composition and conduit temperatures. Typically, functionally effective composition and conduit temperatures can be within the range of about $-20°$ C. to $40°$ C.

Once the composition is dispersed through the conduit, it is allowed to sit for a period of time to allow for softening and dissolving of the binding agents. Generally, from one to three hours is required for the composition to soften or dissolve the binding agents in the conduit. However, in older conduit systems a longer set time may be required. Once the cable has broken free, the composition serves as a lubricant to lower pulling tension.

The cable may be pulled from the conduit by any mechanical means which applies continued substantial force to the cable or may be pulled out by hand when the cable is sufficiently loosened. The mechanical means for removing the cable from a conduit will generally apply continual force to the cable until the cable breaks loose, using a force close to the cable's tensile strength. The tension may have to be on the cable for a few hours, a day, or more. A hydraulic jack may be employed for this purpose, where the tension can be pumped up as necessary. Once the cable is loose, conventional capstan or spiked bull wheels can be used to pull it out, as well as human hands. Other mechanical devices useful in removing cable from a conduit include equipment such as shaking machines which vibrate the cable while it is under tension. These linear shaking machines can help loosen the cable and ease cable removal, and have pulse rates of several thousand cycles per minute. It is believed that the vibration reduces cable contact with the conduit walls, which lowers removal tensions.

The following Examples disclose the preparation of the novel aqueous based composition of the invention and include a best mode.

EXAMPLE 1

The aqueous based composition of Example 1 was made by the following procedure. Into a main mixing vessel was placed 152 gallons of deionized water. Into a separate 5 gallon bucket was placed 4.2 gallons of tall oil fatty acid and 1.2 kilograms of polyacrylic acid (CARBOMER 940). This mixture was stirred until a smooth mixture was obtained, and was then added to the main mixing vessel while stirring. Next, 3.0 kilograms of sodium EDTA was added to the mixing vessel slowly to prevent clumping. Into a separate drum was placed 16 gallons of d-limonene, 16 gallons of petroleum distillate (SOL 140, Shell) and 6.4 gallons of a nonionic surfactant. This mixture was stirred and then pumped into the main mixing vessel with the other components. Into a separate 5 gallon bucket was placed 4 gallons of propylene glycol and 2.2 kilograms of a polyacrylamide polymer (POLYTEC 36, Tecna Corp.). This mixture was stirred with a high sheer mixer to remove lumps and then added to the main mixing vessel while stirring. Into the mixing vessel was next placed 8.84 kilograms of potassium hydroxide and the mixture was stirred for about three to five minutes. The mixer was then turned off and a remix pump was allowed to mix the components for another 5 minutes. The composition of Example 1 was not overmixed because of sheer sensitivity and foam was not allowed to develop during mixing. The mixture was allowed to sit for an additional 15 minutes and checked for uniformity of blend. The formulated composition appeared to be a milky white, stringy, slippery material with a citrus odor and was free of lumps or fish eyes. The composition had a pH of 7.5 to 8.5 and a viscosity of 1,000 cPs plus or minus 500 cPs (Brookfield RVT, spindle 3, 10 rpm).

EXAMPLE 2

The composition of Example 2 was made by the following procedure. Into a main mixing vessel was placed 38 gallons of deionized water. Into a separate 5 gallon pail was placed 3.68 kilograms of tall oil fatty acid, 0.37 kilograms of polyacrylic acid (CARBOPOL 940, B. F. Goodrich Co.) and 1.0 kilogram of sodium EDTA. This mixture was stirred thoroughly with an electric mixer and then added to the mixing vessel and mixed thoroughly. Next, 2.21 kilograms of potassium hydroxide was added to the mixing vessel while stirring briefly at high speed. Into a separate 10 gallon container was placed 4 gallons of d-limonene, 4 gallons of a petroleum distillate (SOL 140, Shell), and 1.6 gallons of a nonionic surfactant and this slurry was then added to the mixing vessel while stirring. Into a separate container was placed 3.68 kilograms of propylene glycol and 0.55 kilograms of a polyacrylamide polymer (POLYTEC 36). This mixture was blended well in an electric mixer and then added to the mixing vessel. The composition in the mixing vessel was then stirred continuously for 30 minutes at slow speed and a stringy, slippery, milky white liquid was obtained.

EXAMPLE 3

The aqueous based composition of Example 3 was formulated using procedures similar to that in making Examples 1 and 2. Table I summarizes the ingredients and respective amounts used in formulating Examples 1-3.

TABLE I

| Ingredient | Amount of Ingredient | | |
|---|---|---|---|
| | Ex. 1 | Ex. 2 | Ex. 3 |
| Deionized Water | 152 gal. | 38 gal. | 152 gal. |
| Tall Oil Fatty Acid | 4.2 gal. | 3.68 kg | 14.3 kg |
| Polyacrylic Acid | 1.2 kg | 0.37 kg | 1.2 kg |
| Sodium EDTA | 3.0 kg | 1.0 kg | 3.0 kg |
| Potassium Hydroxide | 8.84 kg | 2.21 kg | 8.8 kg |
| D-Limonene | 16.0 gal. | 4 gal. | 50.9 kg |
| Petroleum Distillate | 16.0 gal. | 4 gal. | 47.9 kg |
| Nonionic Surfactant | 6.4 gal. | 1.6 gal. | 23.5 kg |
| Propylene Glycol | 4.0 gal. | 3.68 kg | 15.8 kg |
| Polyacrylamide | 2.2 kg | 0.55 kg | 2.2 kg |

EXAMPLE 4

The composition of Example 4 was prepared by the following procedure. Into a mixing vessel was placed 38 gallons of water, and 4.0 kilograms of a saponified tall oil fatty acid (neutralized salt) was dissolved in the water. Into the mixing vessel was next added 0.75 kilograms of sodium EDTA, followed by 0.3 kilograms of polyacrylic acid (CARBOPOL 940) and this mixture was stirred thoroughly. Next, 0.5 kilograms of potassium hydroxide was added to the mixture and mixing was continued. Into a separate container was mixed 4 gallons of d-limonene, 4 gallons of petroleum solvent (SOL 140) and 1.6 gallons of a nonionic surfactant. This slurry was then added to the mixing vessel and mixed thoroughly. Into a separate container, 1 gallon of propylene glycol was mixed with 0.55 kilogram of a polyacrylamide polymer (POLYTEC 36). This mixture was then poured into the mixing vessel and stirred thoroughly for about 15 to 20 minutes. The entire mixture was then allowed to sit for one hour, stirred again and a stringy, milky white liquid was obtained.

Field Tests

The aqueous based composition of the invention was employed in a shopping mall to remove 3 number 12 wires from a metal conduit. The cables were stuck fast in the conduit and could not be moved prior to using the composition. The cable run in the conduit was about 150 feet. The composition was dispersed within the conduit and allowed to sit for about 3 hours. While pulling out the first cable, the other two cables broke free and all cables came out very easily.

At another site, the composition of the invention was used in removing underground cable. The cable to be removed was 3 number 4/0 RHW and 1 number 2 RHW conductors from an underground 3 inch conduit which was 350 feet in length. The cable had been placed in the conduit in 1965. The removal of the old wire, installation of the new conductors, replacement of the associated gear at both ends and re-energization of user equipment attached, all had to be completed within a 60 hour period. The aqueous composition of the invention was dispersed in the conduit at 6:00 p.m. and the following day at 7:30 a.m. the old cable began to be removed. By 1:30 p.m. of the same day all of the old cable had been removed from the conduit. An additional 3 hours was required for cleaning and swabbing the conduit and the entire job was completed well within the time constraints.

The composition of the invention was employed at a different site in removing electrical cable from a 100-plus-unit apartment complex. The runs were typically 80 to 100 feet in EMT conduit. The old cable had been in the conduit for at least 20 years. A coffin hoist was attached to the old cable to break it loose and pull it part way out and then the cable was winched or hand pulled the rest of the way. This method worked fine for 70 of the services, but some 30 runs of the old cable couldn't be moved with the hoist. In these runs the cable would break rather than move after pulling with the hoist. The composition of the invention was poured into the conduits with the stuck cable and the composition was blown all the way through the conduits using compressed air. About one quart of the composition was used for each run. After the composition had set for a few hours, some of the cables were broken loose by hand and pulled out by hand. The other cables were snatched free with the hoist and then removed from the conduit. There was no need to open any walls to get at the cable and all of the "frozen" cable came out of the conduits.

The foregoing description and Examples are illustrative of the invention. However, since many embodiments of the invention can be made without departing from the spirit and scope of the invention, the invention resides wholly in the claims hereinafter appended.

I claim:

1. An aqueous based composition for removing cable from a conduit comprising:
   (a) about 0.5 to 10 wt % of a lubricating agent selected from the group consisting of a $C_8$–$C_{25}$ fatty acid salt compound, a polyacrylamide compound having a molecular weight of about $1\times10^5$ to $20\times10^6$, and mixtures thereof;
   (b) about 5 to 30 wt % of a solvating agent comprising a nonpolar hydrocarbon compound selected from the group consisting of a liquid terpene, a petrochemical hydrocarbon, a liquid halogenated hydrocarbon, and mixtures thereof, wherein said solvating agent softens or dissolves a binding agent present in said conduit which binds said cable to said conduit;
   (c) about 0.2 to 5 wt % of a nonionic surfactant;
   (d) about 0.1 to 5 wt % of sequestrant; and
   (e) a major proportion of water;
   wherein the aqueous composition has a pH of about 3 to 12.

2. The composition of claim 1 further comprising a compound selected from the group consisting of a polyalkylene oxide compound having a molecular weight of about $3\times10^5$ to $5\times10^6$, a polyalkylene glycol compound having a molecular weight of about 120–5000, and mixtures thereof.

3. The composition of claim 1 wherein said fatty acid salt comprises a potassium salt of tall oil fatty acid.

4. The composition of claim 1 wherein said terpene comprises d-limonene, and said petrochemical hydrocarbon comprises a solvent naphtha.

5. The composition of claim 1 wherein said sequestrant comprises sodium ethylenediamine tetraacetic acid.

6. The composition of claim 1 further comprising about 0.1 to 10 wt % of an alkaline source selected from the group consisting of an alkali metal hydroxide, ammonia or ammonium hydroxide, amine compounds, and alkali metal silicates.

7. The composition of claim 6 wherein said alkaline source comprises sodium hydroxide or potassium hydroxide.

8. The composition of claim 1 further comprising about 2 to 20 wt % of a hydroxy compound selected from the group consisting of aliphatic alcohols and glycols.

9. The composition of claim 8 wherein said hydroxy compound is selected from the group consisting of methanol, ethanol, isopropanol, ethylene glycol, propylene glycol, and mixtures thereof.

10. The composition of claim 1 further comprising about 0.01 to 2 wt % of a polyelectrolyte acrylate polymer having a molecular weight of at least about 450,000.

11. The composition of claim 1 wherein said composition has a pH of about 7 to 9.

12. A method for removing cable from a conduit comprising the steps of:
   (a) dispersing the aqueous based composition of claim 17 within the conduit; and
   (b) pulling the cable from the conduit after a period of time of about 1 to 3 hours in which said composition has softened or dissolved a binder present in the conduit which binds the cable to the conduit.

13. The composition of claim 12 wherein said composition is dispersed within the conduit by pumping the composition into the conduit followed by blowing compressed air into the conduit.

14. The method of claim 12 wherein the cable is pulled from the conduit by a mechanical means which applies continued force to the cable.

* * * * *